United States Patent Office 2,906,770
Patented Sept. 29, 1959

2,906,770

PRODUCTION OF PHOSPHORIC AND THIOPHOSPHORIC-DIALKYL ESTER-HYDRAZIDES

Arno Debo, Heidelberg, Germany, assignor to Joh. A. Benckiser G.m.b.H. Chemische Fabrik, Ludwigshafen (Rhine), Germany No Drawing. Application September 12, 1957
Serial No. 683,458

Claims priority, application Germany September 22, 1956

11 Claims. (Cl. 260—461)

The present invention relates to a method of producing phosphoric and thiophosphoric acid dialkyl esterhydrazides.

It is an object of the present invention to provide a method of producing phosphoric and thiophosphoric acid dialkyl ester-hydrazides in high yield and in a simple and easily controllable manner.

It is another object of the present invention to provide a method of producing phosphoric and thiophosphoric acid dialkyl ester-hydrazides according to which method it is not necessary to operate with the exclusion of water.

Other objects and advantages of the present invention will be apparent from a further reading of the specification and of the appended claims.

With the above objects in view, the present invention mainly consists in a method of producing hydrazides of phosphoric and thiophosphoric acid having the following general formula:

(I)

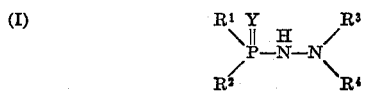

wherein Y is selected from the group consisting of oxygen and sulfur, $R^1$ and $R^2$ are each selected from the group consisting of alkoxy, aryloxy and alkylamino and arylamino groups and wherein $R^3$ and $R^4$ are selected from the group consisting of alkyl groups, aryl groups and hydrogen, comprising the steps of reacting a halogenphosphoric or thiophosphoric acid derivative having the following formula:

(II)

$$(R^1)(R^2)P(Y)—X$$

wherein $R^1$, $R^2$ and Y have the same definitions as above and wherein X is a halogen atom, most particularly the chlorine atom though it may also be another halogen such as bromine, with a hydrazine having the following formula:

(III)

$$H_2NNR^3R^4$$

wherein $R^3$ and $R^4$ have the same definitions as above, in the presence of an aqueous solution of an inorganic base such as sodium carbonate.

Thus, the method of the present invention proceeds in accordance with the following equation:

(IV)

$$(R^1)(R^2)P(Y)—X + H_2NNR^3R^4 + Na_2CO_3 \xrightarrow{H_2O}$$
$$(R^1)(R^2)P(Y)NHNR^3R^4 + NaX + NaHCO_3$$

As compared to the known processes for producing compounds of the type produced in accordance with the present invention wherein the process had to be carried out while carefully avoiding the presence of water and a maximum yield as compared to the utilized hydrazine of only 50% could possibly be obtained, it has surprisingly been found that practically 100% yield as compared to the introduced hydrazine is obtained by carrying out the reaction in aqueous medium in the presence of an inorganic base such as sodium carbonate, this base binding the hydrogen halide which is given off during the reaction.

The method is most suitably carried out by adding the particular hydrazine derivative falling within Formula III above, or its hydrochloride to an aqueous solution of an inorganic base, e.g. an aqueous sodium carbonate solution. The halogen phosphoric acid derivative falling within Formula II above is then added dropwise under stirring, and if necessary cooling, to the mixture. The reaction mixture is subsequently diluted with water and the resulting hydrazide is separated therefrom. In the case of crystallization of water insoluble hydrazine derivatives the separation may often be improved by first slightly acidifying the reaction mixture.

In the Formula I given above, $R^1$ and $R^2$ can be all alkoxy groups of which the alkyl group may be from 1-18 carbon atoms, $R^1$ and $R^2$ may be an aryloxy group such as phenyloxy, cresyloxy, benzyloxy and the like, or $R^1$ and $R^2$ may be alkylamino and arylamino groups such as dimethylamino, diethylamino, dipropylamino, diphenylamino, and the like. The following are among the compounds that may be produced in accordance with the method of the present invention:

$(CH_3O)_2P(O)HNNHC_6H_5$
$(C_2H_5O)_2P(O)HNNHC_6H_5$
$(C_3H_7O)_2P(O)HNNHC_6H_5$
$(C_4H_9O)_2P(O)HNNHC_6H_5$
$(CH_3O)_2P(S)HNNHC_6H_5$
$(C_2H_5O)_2P(S)HNNHC_6H_5$
$(C_3H_7O)_2P(S)HNNHC_6H_5$
$(C_4H_9O)_2P(S)HNNHC_6H_5$
$(CH_3O)_2P(O)HNNH_2$
$(C_2H_5O)_2P(O)HNNH_2$
$(C_3H_7O)_2P(O)HNNH_2$
$(C_4H_9O)_2P(O)HNNH_2$
$(CH_3O)_2P(S)HNNH_2$
$(C_2H_5O)_2P(S)HNNH_2$
$(C_3H_7O)_2P(S)HNNH_2$
$(C_4H_9O)_2P(S)HNNH_2$
$(CH_3O)_2P(O)HNNHCH_3$
$(C_2H_5O)_2P(S)HNNHCH_3$
$(C_6H_5O)_2P(O)HNNHCH_3$
$(C_6H_5O)_2P(S)HNNHCH_3$
$((CH_3)_2N)P(O)HNNHC_6H_5$
$((C_2H_5)_2N)P(O)HNNHC_6H_5$
$((C_3H_7)_2N)P(O)HNH_2$

The method of the present invention may be carried out utilizing all known halogenphosphoric acid and thiophosphoric acid diesters falling within Formula II above. The following is a list of some suitable chlorophosphoric and thiophosphoric acid dialkyl esters which may be utilized in accordance with the present invention:

$ClP(O)(OCH_3)_2$
$ClP(O)(OC_2H_5)_2$
$ClP(O)(OC_3H_7)_2$
$ClP(O)(OC_4H_9)_2$
$ClP(S)(OCH_3)_2$
$ClP(S)(OC_2H_5)_2$
$ClP(S)(OC_3H_7)_2$
$ClP(S)(OC_4H_9)_2$

Of course the corresponding bromine esters of the above compounds can be used in place of the chlorine esters. Likewise, mixed esters can be used, as for example the following:

$ClP(O)(OCH_3)OC_2H_5$
$ClP(S)(OC_2H_5)OC_3H_7$

The following are among the suitable aryl esters that may be utilized as starting material in accordance with the present invention:

$$ClP(S)(OC_6H_5)_2$$
$$ClP(O)(OC_6H_5)_2$$
$$ClP(O)(OCH_2C_6H_5)_2$$

Phosphoric and thiophosphoric acid amine derivatives may also be utilized in accordance with the present invention as starting material, as for example the following:

$$ClP(O)(N(CH_3)_2)$$
$$ClP(S)(N(CH_3)_2)$$
$$ClP(O)(N(C_2H_5)_2)$$

All hydrazines falling within Formula III above may be utilized in accordance with the present invention. The following are among the suitable hydrazines:

$$H_2NNHCH_3$$
$$H_2NNHC_2H_5$$
$$H_2NNHC_3H_7$$
$$H_2NNHC_4H_9$$
$$H_2NNHC_8H_{17}$$
$$H_2NN(C_2H_5)_2$$
$$H_2NNHC_6H_5$$
$$H_2NN(C_6H_5)_2$$

Among the suitable inorganic bases which may be utilized in accordance with the present invention are sodium carbonate, sodium hydroxide, ammonium hydroxide, potassium carbonate, potassium hydroxide, and calcium hydroxide. Of course, the cheapest inorganic bases are most desirable from the point of view of economy, as for example sodium hydroxide and sodium carbonate. The concentration of the inorganic bases in the aqueous solution may vary for example between 5 and 30%, the most preferred concentration being 20% by weight.

The following examples are given to further illustrate the present invention, the scope of the invention not however being limited to the specific details of the examples.

EXAMPLE 1

*Phosphoric acid-diethylester-phenylhydrazide*

(V)   $(C_2H_5O)_2P(O)HNNHC_6H_5$ 33.7 g. of monochlorophosphoric acid-diethylester are added dropwise under stirring into a mixture of 130 cc. of 20% sodium carbonate solution in water and 21.6 g. of phenylhydrazine. The reaction mixture is subsequently diluted with 400 cc. of water. The liquid is suctioned off from the precipitated crystalline mass and the latter is washed with water. After drying 33.5 g. of the desired compound having a melting point of 113° C. (from ethanol) are obtained.

EXAMPLE 2

*Phosphoric acid-di-n-propylester-phenylhydrazide*

(VI)   $(C_3H_7O)_2P(O)HNNHC_6H_5$

The production proceeds as is described in Example 1, however utilizing 40.1 g. of monochlorophosphoric acid-di-n-propylester. After dilution with 200 cc. of water, the pH is adjusted to 6 by means of dilute hydrochloric acid and the further procedure is as above described. The yield equals 40.1 g., corresponding to 96.3% of the theoretical. The melting point (from carbon tetrachloride), is 112° C.

EXAMPLE 3

*Phosphoric acid-diphenylester-phenylhydrazide*

(VII)   $(C_6H_5O)_2P(O)HNNHC_6H_5$ 53.7 g. of monochlorophosphoric acid-diphenylester is added dropwise under stirring and cooling with ice water to 21.6 g. of phenylhydrazine and 130 cc. of 20% sodium carbonate aqueous solution. After completion of the addition the reaction mixture is diluted with about 300 cc. of water and dilute hydrochloric acid is added to the reaction mixture until the same reacts markedly acid. The liquid is filtered off from the precipitated white mass. After drying 67 g. of the desired compound corresponding to 98.6% of the theoretical is obtained. The melting point (from ethanol) of the compound is 155.5° C.

EXAMPLE 4

*Phosphoric acid-bis-diethylamide-monophenylhydrazide*

(VIII)   $C_6H_5NHNH(O)P[N(C_2H_5)_2]_2$ 23 g. of monochlorophosphoric acid-bis-diethylamide is added dropwise under vigorous stirring to a mixture of 11 g. of phenylhydrazine and 65 cc. of aqueous 20% sodium carbonate solution. After completion of the addition the reaction mixture is stirred for an additional ½ hour and the precipitate is then filtered off by suction. After drying 28 g. of the desired compound is obtained, corresponding to 94% of the theoretical. The melting point after recrystallization from ethanol is 152° C.

The compounds produced according to the method of the present invention have various applications as intermediate and end products for pharmaceutical preparations, textile treating agents, lubricating oil additives, and the like.

EXAMPLE 5

*Thiophosphoric acid-O,O-diethylester-phenylhydrazide*

(IX)   $(C_2H_5O)_2PSHNNHC_6H_5$ 37.7 g. of monochlorothiophosphoric acid-diethylester are added under stirring to a mixture of 130 cc. of aqueous 20% sodium carbonate solution and 21.6 g. of phenyl hydrazine. After completion of the addition the reaction mixture is stirred for an additional ½ hour. The precipitated crystalline slurry is filtered off by suction and dried. There is thus obtained 47 g. of thiophosphoric acid-diethylester-phenylhydrazide, which corresponds to a yield of 90.3% of the theoretical. The melting point after recrystallization from ethanol is 72° C.

EXAMPLE 6

*Phosphoric acid-di-n-propylester-methylhydrazide*

(X)   $(n\text{-}C_3H_7O)_2P(O)HNNHCH_3$ 9.2 g. of methylhydrazine are stirred with 100 cc. of aqueous 20% sodium carbonate solution and then under further stirring 40.1 g. of monochlorophosphoric acid-dipropylester are added dropwise. After completion of the addition the reaction mixture is evaporated under vacuum and the residue is extracted with hexane. The hexane solution is distilled, the desired compound going over at 114° C. under 3 mm. Hg. The yield is 25.5 g. The M.P.$_{.3}$=114° C.; $n_D^{20}$=1.4430.

EXAMPLE 7

*Phosphoric acid-diphenylester-methylhydrazide*

(XI)   $(C_6H_5O)_2P(O)HNNHCH_3$ 53.8 g. of monochlorophoric acid-diphenylester are added dropwise under stirring to 9.2 g. of methylhydrazine and 100 cc. of aqueous 20% sodium carbonate solution. The reaction mixture is stirred for an additional 10 minutes and then about 250 cc. of water are added thereto. The precipitated oil is separated from the reaction mixture and dried. This results in the obtention of 50 g. of the desired compound having a melting point of 51° C.

EXAMPLE 8

*Phosphoric acid-diphenylester-hydrazide*

(XII)   $(n\text{-}C_3H_7O)_2P(O)HNNH_2$ 26 g. of hydrazine sulfate are dissolved in 250 cc. of aqueous 20% sodium carbonate solution. 53.8 g. of monochlorophosphoric acid-diphenylester are added dropwise to the solution while vibrating the same. After completion of the addition vibration is continued for an additional 15 minutes, 250 cc. of water added thereto and the reaction mixture is then filtered to separate the precipitated crystalline slurry. There is thus obtained 45 g. of the desired compound having a melting point of 113° C. (from 70% ethanol).

EXAMPLE 9

*Thiophosphoric acid-O,O-diethylester-methylhydrazide*

(XIII)      $(C_2H_5O)_2P(S)HNNHCH_3$ 36.7 g. of chlorothiophosphoric acid-diethylester are added dropwise under vigorous stirring to 9.2 g. of methylhydrazine and 100 cc. of aqueous 20% sodium carbonate solution. 100 cc. of water are then added to the reaction mixture and the precipitated oil is separated in a separatory funnel. It is then dried over sodium sulfate. There is thus obtained 34 g. of the desired compound, corresponding to a yield of 90.2% of the theoretical. The B.P.$_2$=78° C.; $n_D^{20}$=1.4857.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of producing compounds of the following general formula:

$$\begin{array}{c} R^1 \\ \diagdown \\ R^2 \end{array} \!\! \begin{array}{c} Y \\ \| \\ P \\ \diagup \end{array} \!\! \begin{array}{c} H \\ -N-N \end{array} \!\! \begin{array}{c} \diagup R^3 \\ \\ \diagdown R^4 \end{array}$$

wherein $R^1$ and $R^2$ are selected from the group consisting of alkoxy radicals of 1–18 carbon atoms, phenyloxy, cresyloxy, benzloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of reacting a halogenphosphoric acid ester having the following general formula:

$(R^1)(R^2)P(Y)$—X wherein $R^1$, $R^2$ and Y have the above definitions and wherein X is a halogen atom selected from the group consisting of chlorine and bromine with a hydrazine having the following general formula:

$H_2NNR^3R^4$ wherein $R^3$ and $R^4$ have the above definitions in an aqueous medium in the presence of a sufficient amount of an inorganic base to bind the hydrogen halide given off in the reaction; and recovering the thus-formed substance selected from the group consisting of phosphoric acid and thiophosphoric acid-dialkyl ester-hydrazides.

2. A method of producing compounds of the following general formula:

$$\begin{array}{c} R^1 \\ \diagdown \\ R^2 \end{array} \!\! \begin{array}{c} Y \\ \| \\ P \\ \diagup \end{array} \!\! \begin{array}{c} H \\ -N-N \end{array} \!\! \begin{array}{c} \diagup R^3 \\ \\ \diagdown R^4 \end{array}$$

wherein $R^1$ and $R^2$ are selected from the group consisting of alkoxy radicals of 1–18 carbon atoms, phenyloxy, cresyloxy, benzyloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of adding a halogen-phosphoric acid ester having the following general formula:

$(R^1)(R^2)P(Y)$—X wherein $R^1$, $R^2$ and Y have the above definitions and wherein X is a chlorine atom to an aqueous solution of an inorganic base containing a hydrazine having the following general formula:

$H_2NNR^3R^4$ wherein $R^3$ and $R^4$ have the above definitions; and recovering the thus-formed substance selected from the group consisting of phosphoric acid and thiophosphoric acid-dialkyl esterhydrazides.

3. A method of producing compounds of the following general formula:

$$\begin{array}{c} R^1 \\ \diagdown \\ R^2 \end{array} \!\! \begin{array}{c} Y \\ \| \\ P \\ \diagup \end{array} \!\! \begin{array}{c} H \\ -N-N \end{array} \!\! \begin{array}{c} \diagup R^3 \\ \\ \diagdown R^4 \end{array}$$

wherein $R^1$ and $R^2$ are selected from the group consisting of alkoxy radicals of 1–18 carbon atoms, phenyloxy, cresyloxy, benzyloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of reacting a halogenphosphoric acid ester having the following general formula:

$(R^1)(R^2)P(Y)$—X wherein $R^1$, $R^2$ and Y have the above definitions and wherein X is a halogen atom selected from the group consisting of chlorine and bromine with a hydrazine having the following general formula:

$H_2NNR^3R^4$ wherein $R^3$ and $R^4$ have the above definitions in an aqueous medium in the presence of a sufficient amount of an inorganic base to bind the hydrogen halide given off in the reaction and being selected from the group consisting of sodium carbonate, sodium hydroxide, ammonium hydroxide, potassium hydroxide, potassium carbonate and calcium hydroxide; and recovering the thus-formed substance selected from the group consisting of phosphoric acid and thiophosphoric acid-dialkyl esterhydrazides.

4. A method of producing compounds of the following general formula:

$$\begin{array}{c} R^1 \\ \diagdown \\ R^2 \end{array} \!\! \begin{array}{c} Y \\ \| \\ P \\ \diagup \end{array} \!\! \begin{array}{c} H \\ -N-N \end{array} \!\! \begin{array}{c} \diagup R^3 \\ \\ \diagdown R^4 \end{array}$$

wherein $R^1$ and $R^2$ are selected from the group consisting of alkoxy radicals of 1–18 carbon atoms, phenyloxy, cresyloxy, benzyloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of adding a halogenphosphoric acid ester having the following general formula:

$(R^1)(R^2)P(Y)$—X wherein $R^1$, $R^2$ and Y have the above definitions and wherein X is a chlorine atom to an aqueous solution of an inorganic base selected from the group consisting of sodium carbonate, sodium hydroxide, ammonium hydroxide, potassium hydroxide, potassium carbonate and calcium hydroxide containing a hydrazine having the following general formula:

$$H_2NNR^3R^4$$

wherein $R^3$ and $R^4$ have the above definitions; and recovering the thus-formed substance selected from the group consisting of phosphoric acid and thiophosphoric acid-dialkyl ester-hydrazides.

5. A method of producing compounds of the following general formula:

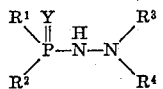

wherein $R^1$ and $R^2$ are selected from the group consisting of alkoxy radicals of 1–18 carbon atoms, phenyloxy, cresyloxy, benzyloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of adding a halogenphosphoric acid ester having the following general formula:

$$(R^1)(R^2)P(Y)—X$$

wherein $R^1$, $R^2$ and Y have the above definitions and wherein X is a halogen atom selected from the group consisting of chlorine and bromine to an aqueous 5–30% solution of an inorganic base containing a hydrazine having the following general formula:

$$H_2NNR^3R^4$$

wherein $R^3$ and $R^4$ have the above definitions; and recovering the thus-formed substance selected from the group consisting of phosphoric acid and thiophosphoric acid-dialkyl ester-hydrazides.

6. A method of producing compounds of the following general formula:

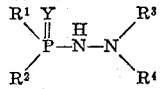

wherein $R^1$ and $R^2$ are selected from the group consisting of alkoxy radicals of 1–18 carbon atoms, phenyloxy, cresyloxy, benzyloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of adding a halogenphosphoric acid ester having the following general formula:

$$(R^1)(R^2)P(Y)—X$$

wherein $R^1$, $R^2$ and Y have the above definitions and wherein X is a chlorine atom to an aqueous 5–30% solution of an inorganic base selected from the group consisting of sodium carbonate, sodium hydroxide, ammonium hydroxide, potassium hydroxide, potassium carbonate and calcium hydroxide containing a hydrazine having the following general formula:

$$H_2NNR^3R^4$$

wherein $R^3$ and $R^4$ have the above definitions; and recovering the thus-formed substance selected from the group consisting of phosphoric acid and thiophosphoric acid-dialkyl ester-hydrazides.

7. A method of producing compounds of the following general formula:

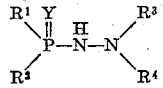

wherein $R^1$ and $R^2$ are selected from the group consisting of alkoxy radicals of 1–18 carbon atoms, phenyloxy, cresyloxy, benzyloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of reacting approximately equimolecular amounts of a halogenphosphoric acid ester having the following general formula:

$$(R^1)(R^2)P(Y)—X$$

wherein $R^1$, $R^2$ and Y have the above definitions and wherein X is a chlorine atom with a hydrazine having the following general formula:

$$H_2NNR^3R^4$$

wherein $R^3$ and $R^4$ have the above definitions in an aqueous medium in the presence of a sufficient amount of an inorganic base to bind the hydrogen halide given off in the reaction; and recovering the thus-formed substance selected from the group consisting of phosphoric acid and thiophosphoric acid-dialkyl ester-hydrazides.

8. A method of producing compounds of the following general formula:

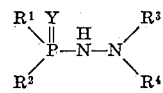

wherein $R^1$ and $R^2$ are selected from the group consisting of alkoxy, radicals of 1–18 carbon atoms, phenyloxy, cresyloxy, benzyloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of adding a halogenphosphoric acid ester having the following general formula:

$$(R^1)(R^2)P(Y)—X$$

wherein $R^1$, $R^2$ and Y have the above definitions and wherein X is a chlorine atom to an aqueous solution of an inorganic base containing a hydrazine having the following general formula:

$$H_2NNR^3R^4$$

wherein $R^3$ and $R^4$ have the above definitions, said halogen-phosphoric acid ester, and said hydrazine being in approximately equimolecular amounts; and recovering the thus-formed substance selected from the group consisting of phosphoric acid and thiophosphoric acid-dialkyl ester-hydrazides.

9. A method of producing compounds of the following general formula:

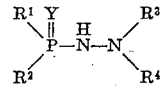

wherein $R^1$ and $R^2$ are selected from the group consisting of alkoxy, radicals of 1–18 carbon atoms, phenyloxy, cresyloxy, benzyloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of reacting a halogenphosphoric acid ester having the following general formula:

$$(R^1)(R^2)P(Y)—X$$

wherein $R^1$, $R^2$ and Y have the above definitions and wherein X is a chlorine atom with a hydrazine having the following general formula:

$$H_2NNR^3R^4$$

wherein $R^3$ and $R^4$ have the above definitions in an aqueous medium in the presence of a sufficient amount of sodium carbonate to bind the hydrogen halide given off in the reaction; and recovering the thus-formed substance selected from the group consisting of phosphoric acid and thiophosphoric acid-dialkyl esterhydrazides.

10. A method of producing compounds of the following general formula:

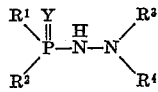

wherein $R^1$ and $R^2$ are selected from the group consisting of alkoxy radicals of 1–18 carbon atoms, phenyloxy, cresyloxy, benzyloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of adding a halogenphosphoric acid ester having the following general formula:

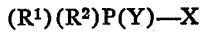

wherein $R^1$, $R^2$ and Y have the above definitions and wherein X is a halogen atom selected from the group consisting of chlorine and bromine to an aqueous 5–30% solution of sodium carbonate containing a hydrazine having the following general formula:

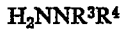

wherein $R^3$ and $R^4$ have the above definitions; and recovering the thus-formed substance selected from the group consisting of phosphoric acid and thiophosphoric acid-dialkyl ester-hydrazides.

11. A method of producing compounds of the following general formula:

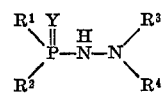

wherein $R^1$ and $R^2$ are selected from the group consisting of alkoxy radicals of 1–18 carbon atoms, phenyloxy, cresyloxy, benzyloxy, dimethylamino, diethylamino, dipropylamino and diphenylamino groups, wherein Y is selected from the group consisting of oxygen and sulfur, and wherein $R^3$ and $R^4$ are selected from the group consisting of alkyl groups of 1–8 carbon atoms, the phenyl group and hydrogen, comprising the steps of adding dropwise while stirring a holagenphosphoric acid ester having the following general formula:

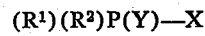

wherein $R^1$, $R^2$ and Y have the above definitions and wherein X is a chlorine atom to an aqueous solution of an inorganic base containing a hydrazine having the following general formula:

wherein $R^3$ and $R^4$ have the above definitions; and recovering the thus-formed substance selected from the group consisting of phosphoric acid and thiophosphoric acid-dialkyl esterhydrazides.

References Cited in the file of this patent

Melnikov et al.: Fertilizer and Insectofungicide Research Institute Zhur Obshchei Khim, 25, 828–31 (1955).